US010080149B2

(12) United States Patent
Anderson et al.

(10) Patent No.: US 10,080,149 B2
(45) Date of Patent: Sep. 18, 2018

(54) COVERAGE SOLUTION RECOMMENDATION TOOL

(71) Applicant: T-Mobile USA, Inc., Bellevue, WA (US)

(72) Inventors: Steve Anderson, Fall City, WA (US); Robert Dean Cook, Renton, WA (US); Della Jolene Conley, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/849,036

(22) Filed: Sep. 9, 2015

(65) Prior Publication Data

US 2017/0070898 A1    Mar. 9, 2017

(51) Int. Cl.
  *H04W 24/00* (2009.01)
  *H04W 24/04* (2009.01)
  *H04W 4/02* (2018.01)
  *H04W 16/26* (2009.01)

(52) U.S. Cl.
  CPC .......... *H04W 24/04* (2013.01); *H04W 4/02* (2013.01); *H04W 16/26* (2013.01)

(58) Field of Classification Search
  CPC ..... H04W 24/00; H04W 24/02; H04W 24/04; H04W 24/06; H04W 24/08; H04W 4/02; H04W 4/24; H04W 4/26; H04W 16/18; H04W 88/02
  USPC .......... 455/423, 424, 425, 406, 67.11, 226.1, 455/226.3
  See application file for complete search history.

(56) References Cited

U.S. PATENT DOCUMENTS

| 2010/0151858 | A1   | 6/2010 | Brisebois et al. |
| 2015/0111598 | A1   | 4/2015 | Azami |
| 2015/0141027 | A1* | 5/2015 | Tsui ................... H04W 52/243 455/452.1 |
| 2016/0029295 | A1   | 1/2016 | Nagasaka et al. |
| 2016/0057651 | A1* | 2/2016 | Backholm ......... H04W 28/0284 370/235 |
| 2016/0068264 | A1* | 3/2016 | Ganesh ............... G08G 5/0069 701/2 |
| 2016/0191142 | A1* | 6/2016 | Boss ..................... H04W 84/06 455/405 |
| 2018/0192340 | A1   | 7/2018 | Karimli et al. |

OTHER PUBLICATIONS

Office action for U.S. Appl. No. 15/396,089, dated Feb. 26, 2018, Karimli et al., "Method and Apparatus for Migrating From Licensed Spectrum to Unlicensed Spectrum", 23 pages.

* cited by examiner

Primary Examiner — Temica M Beamer
(74) Attorney, Agent, or Firm — Lee & Hayes, PLLC

(57) ABSTRACT

A coverage solution recommendation tool may generate prioritized lists of coverage solutions for resolving a network coverage problem at a location. The tool may obtain network parameters of a wireless communication network that provides services to user devices at the location. The tool may further acquire device parameters of the user devices used at the location, as well as collect environment parameters associated with the location. The environment parameters may affect whether a wireless telecommunication carrier is able to leverage additional coverage solutions to provide services at the location. Accordingly, the coverage solution tool may generate a prioritized list of coverage solutions for resolving the network coverage problem based on the parameters.

20 Claims, 9 Drawing Sheets

COVERAGE SOLUTION RECOMMENDATION TOOL

BACKGROUND

Mobile devices are integral to the daily lives of most users. Wireless communication devices are used to make voice calls, check email and text messages, update social media pages, stream media, browse websites, and so forth. As a result, users of mobile devices expect a wireless telecommunication carrier to provide constant and reliable telecommunication and data communication services at all times.

The reliability of telecommunication and data communication services may be affected by multiple factors, such as geography and terrain, device features and capabilities, as well as network infrastructure and network coverage deployment. A wireless telecommunication carrier may offer different coverage solutions to improve network coverage and increase network reliability, but often such coverage solutions cannot be offered in real time. For example, a user may call a customer service representative of a wireless telecommunication carrier with a report of with a network coverage problem. However, the customer service representative may have insufficient time or information to analyze the particular factors and circumstances that are affecting the user in order to recommend the appropriate coverage solution to the problem experienced by the user.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
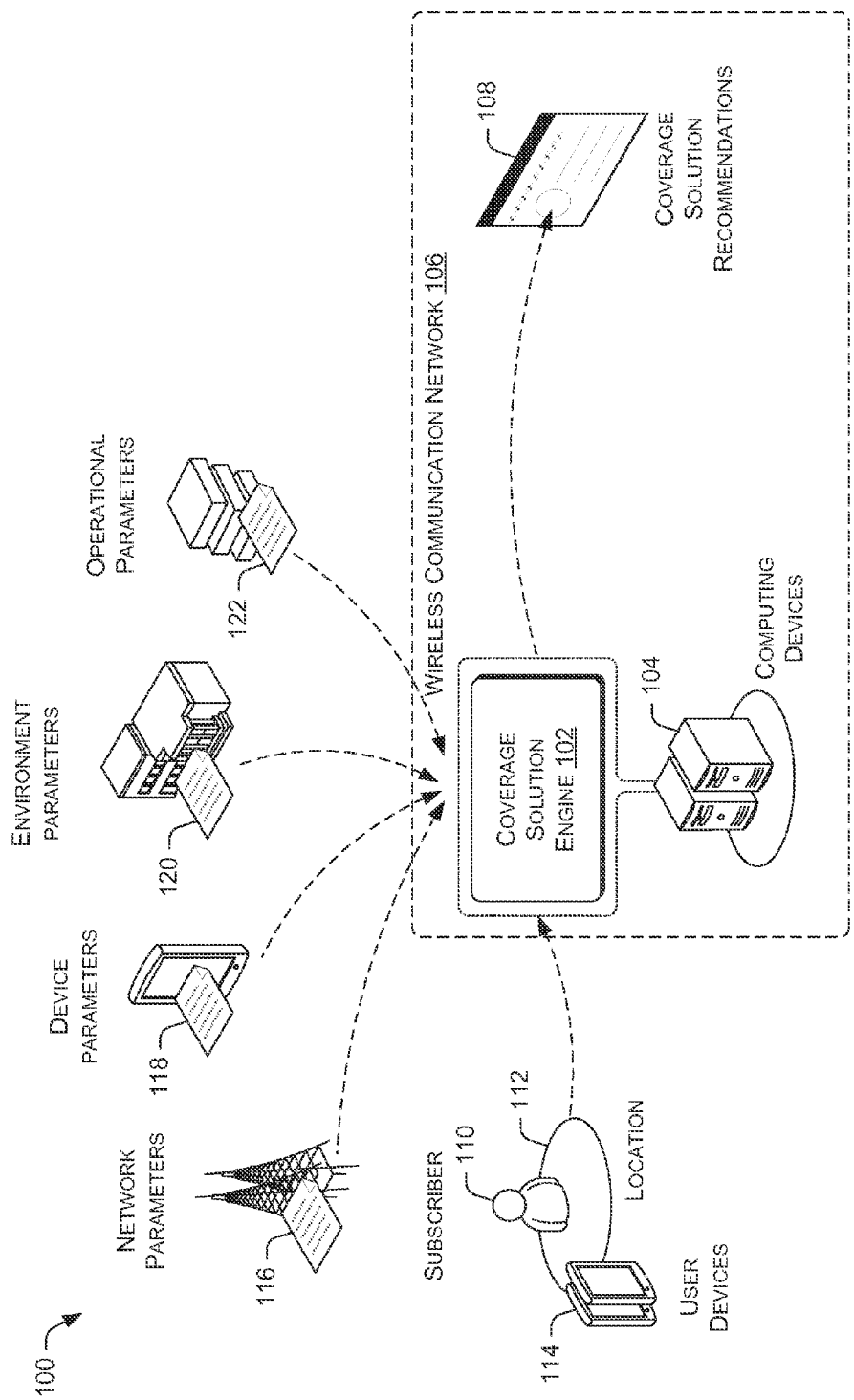
FIG. 1 illustrates an example architecture for deploying a coverage solution recommendation tool.

This disclosure is directed to techniques for using a coverage recommendation tool to recommend one or more coverage solutions that remedy a network coverage problem with respect to a wireless communication network. The network coverage problem may be experienced by a particular subscriber at a specific geographical location. The network coverage problem may manifest itself as frequently dropped calls, incomplete calls, slow data downloads or uploads, and/or other symptoms. The recommended coverage solutions may include implementation of Wi-Fi calling, distribution of new Wi-Fi routers, selective installation of signal boosters, deployment of new small network cells, and/or so forth. The coverage solution recommendation tool may include a decision engine that selects one or more coverage solutions based on input parameters associated with the nature of a coverage problem. The input parameters may include network parameters of the wireless communication network, device parameters of one or more user devices utilized by the subscriber, and environment parameters at geographical location of the subscriber. In some instances, operational parameters of the wireless telecommunication carrier that operates the wireless telecommunication network may also play a role. In various embodiments, the coverage solution recommendation tool may generate a prioritized list of coverage solutions that are applicable to the coverage problem. Accordingly, the prioritized list may provide the user with an optimal coverage solution, as well as access to alternative coverage solutions in the event the user elects to forego the optimal coverage solution.

In some embodiments, the coverage solution recommendation tool may be provided to a customer service representative at the wireless telecommunication carrier. In such embodiments, the customer service representative may use the coverage solution recommendation tool to assist subscribers who are experiencing network coverage problems with obtaining the ideal coverage solution. However, in other embodiments, the coverage solution recommendation tool may be deployed as a web-based application that is accessible to authorized subscribers of the wireless telecommunication carrier. In this way, the coverage solution recommendation tool may function as a self-help tool that enables the authorized subscribers to explore different coverage solutions to their network coverage problems.

Accordingly, the coverage solution recommendation tool may generate prioritized lists of coverage solutions by taking into account multiple operational considerations, network parameters and device features, as well as environmental variables that are otherwise difficult for a customer service representative to analyze in an expedient and coherent manner. The use of the coverage solution recommendation tool may enable customer service representatives to quickly and easily provide coverage solutions for network coverage problems experienced by subscribers. Thus, the coverage solution recommendation tool may reduce the durations of customer service support calls, increase customer satisfaction and retention, and generate higher revenue for wireless telecommunication carriers. The techniques described herein may be implemented in a number of ways. Example implementations are provided below with reference to the following figures.

Example Network Architecture

FIG. 1 illustrates an example architecture 100 for deploying a coverage solution recommendation tool. The architecture 100 may include a coverage solution engine 102. The coverage solution engine 102 may execute on one or more computing devices 104. The computing devices 104 may include general purpose computers, such as desktop computers, tablet computers, laptop computers, servers, and so forth. However, in other embodiments, the computing devices 104 may include smart phones, game consoles, or other electronic devices that are capable of receive inputs, process the inputs, and generate output data. In various embodiments, the computing devices 104 may be operated by a wireless telecommunication carrier or a third-party entity that is working with the wireless telecommunication carrier.

The coverage solution engine 102 may provide one or more recommended coverage solutions 108 for remedying a network coverage problem. The network coverage problem may be experienced by a subscriber 110 at a location 112 while using one or more user devices 114. The one or more user devices 114 may be experiencing the network coverage problem while using services provided by the wireless communication network 106. In various embodiments, each of the user devices 114 may be a smart phone, a feature phone, a tablet computer, or another type of communication device. The location 112 may be a residential address, a business address, a set of geographical coordinates, and/or the like. The recommended coverage solutions 108 may include implementation of Wi-Fi calling, distribution of Wi-Fi routers, selective installation of signal boosters, deployment of small network cells, and/or so forth. The implementation of Wi-Fi calling for a user device may involve configuring the software applications that are installed on the user device to support Wi-Fi calling. The distribution of a Wi-Fi router may involve the installation of a new Wi-Fi router or a replacement Wi-Fi router at a location with a connection to the Internet. The new Wi-Fi router may support Wi-Fi calling through Wi-Fi calling capable user devices over an Internet connection at the location. In some instances, the coverage solution engine 102 may generate a prioritized list of recommended coverage solutions that are applicable to the coverage problem.

In various embodiments, the coverage solution engine 102 may generate the one or more recommend coverage solutions 108 for the network coverage problem at the location 112 based on network parameters 116, device parameters 118, environment parameters 120, and/or operational parameters 122. The network parameters 116 may include parameters that affect the deployment of telecommunication services by the wireless telecommunication carrier. For example, the network parameters 116 may include the availability of spectrum licenses at the location 112, the availability of a Public Safety Access Point (PSAP) for the location 112, the types of telecommunication carrier network signals that cover the location 112, and/or so forth.

The device parameters 118 may include features and specification of the one or more user devices used by the subscriber 110 that are experiencing network coverage problems at the location 112. For example, the device parameters 118 may include whether a user device is capable of more than 2G telecommunication, whether a user device is a Long-Term Evolution (LTE)-compatible device, whether a user device is capable of Wi-Fi calling, and/or so forth. The environment parameters 120 may include environmental variables that impact whether the wireless telecommunication carrier is able to leverage additional coverage solutions to provide telecommunication or data communication services at the location 112. For example, the environmental parameters may include whether access to the Internet is available at the location 112, whether there is sufficient Wi-Fi coverage at the location 112, the presence or absence of pre-existing deployed small network cells proximate to the location 112, and/or so forth. The operational parameters 122 may include consideration that relate to the business operations of the telecommunication carrier that operates the wireless communication network 106. For example, the operational parameters 122 may include the inventory quantities of devices that can be used to provide the coverage solutions, the profit or cost savings generated from the deployment of each coverage solution, whether a particular version of such a device may be substitute by another version of the device, the technical longevity of each coverage solution device, and/or so forth.

In various embodiments, the network parameters 116, the device parameters 118, the environment parameters 120, and the operational parameters 122 may be processed by decision algorithms of the coverage solution engine 102. In turn, the decision algorithms of the coverage solution engine 102 may provide one or more recommended coverage solutions 108 for remedying a network coverage problem that a subscriber 110 is experiencing at a location 112.

Example Computing Device Components

Figure 2:
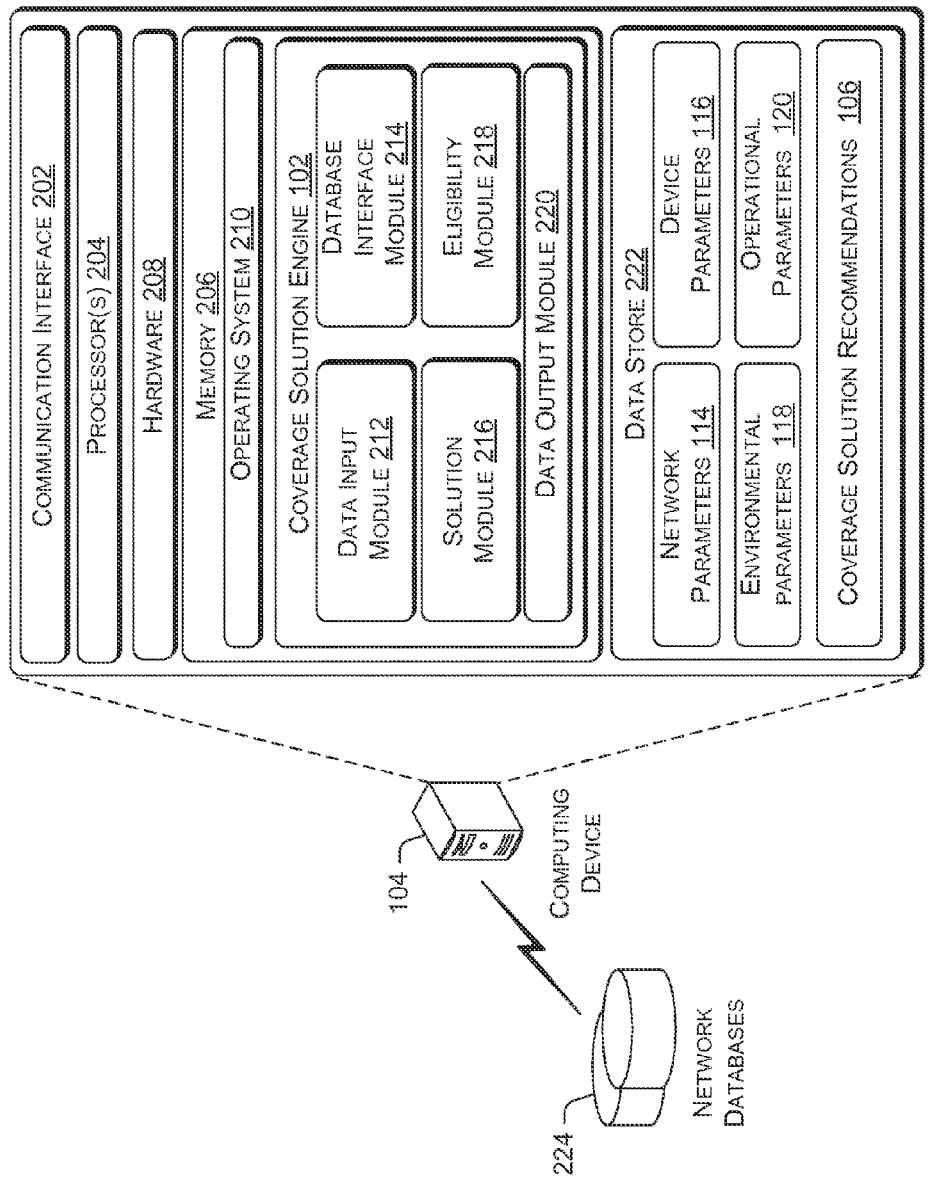
FIG. 2 is a block diagram showing various components of one or more illustrative computing devices that implement the coverage solution recommendation tool.

FIG. 2 is a block diagram showing various components of one or more illustrative computing devices that implement the coverage solution recommendation tool. The computing devices 104 may include a communication interface 202, one or more processors 204, memory 206, and hardware 208. The communication interface 202 may include wireless and/or wired communication components that enable the server to transmit data to and receive data from other networked devices. The hardware 208 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the computing devices 104 may implement an operating system 210 and the coverage solution engine 102. The operating system 210 may include components that enable the computing devices 104 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The coverage solution engine 102 may include a data input module 212, a database interface module 214, a solution module 216, an eligibility module 218, and a data output module 220. The modules may include routines, program instructions, objects, and/or data structures that perform particular tasks or implement particular abstract data types. The memory 206 may also include a data store 222 that is used by the coverage solution engine 102. In various embodiments, the coverage solution engine 102 may be a standalone application or a web-based application.

The data input module 212 may receive data that are inputted by a user via application user interfaces. The application user interfaces may be presented via the standalone application or a web browser executing on a computing device. The data may include an identity of the subscriber, a location at which the subscriber is experience network coverage problems, the identity of each user device that the subscriber is using at the location. In various embodiments, the location may be a residential address, a business address, a set of geographical coordinates, and/or the like. The data may further include various other parameters, such as at one or more of the device parameters 118 and one or more of the environment parameters 120. For example, a user may input whether a user device is capable of more than 2G telecommunication, whether a user device is a LTE-compatible device, whether a user device is capable of Wi-Fi calling, whether access to the Internet is available at the location 112, and/or forth.

The database interface module 214 may interface with one or more network databases 224. The network databases may include an engineering database where one or more network parameters 116 are stored. For example, information such as the availability of spectrum licenses at the location, the availability of a PSAP for the location, the type and robustness of telecommunication carrier network signals that cover the location may be obtained from the engineering database. The types of the telecommunication carrier network signals may include Second Generation (2G), Personal Communication Service (PCS), Advanced Wireless Services (AWS), and/or so forth. Signal robustness may be quantified in a multitude of ways, such as via signal strength or signal quality. Signal strength may be measured via received signal strength indicator (RSSI), reference signal received power (RSRP), received channel power indicator (RCPI), or other measurements. Signal quality may be measured through energy to interface ratio (ECIO), reference signal received quality (RSRQ), signal to interference-plus-noise ratio (SINR), or other measurements.

In various embodiments, the engineering database may also store information on the locations of known network coverage problems, as well as locations, identities, and description of coverage devices that have been deployed to solve the known network coverage problems.

The network databases 224 may also include a subscriber database. The subscriber database may store information regarding each subscriber, such as the subscriber 110. For example, the information stored for a subscriber may include subscriber contact information, such as addresses and phone numbers. The information may further include subscriber authentication data, subscriber account information, subscriber payment information, subscriber payment history, user devices that are associated with the subscriber, and/or so forth. The subscriber account information may indicate whether the subscriber is a prepaid subscriber or a postpaid subscriber. The subscriber payment history may indicate whether the account of the subscriber is in good standing or delinquent, i.e., whether the subscriber is current on payments or failed to make a predetermined number of periodic payments. In some embodiments, the subscriber database may also store information regarding any coverage devices that have already been deployed to solve network coverage problems reported by each subscriber.

The network databases 224 may also include one or more device databases. The device databases may store device information on the user devices of the subscribers that are serviced by the wireless communication network 106. For example, the device information for a user device may include data on device features, device hardware and software specifications, device network compatibility, device configuration information, and/or so forth. In various embodiments, the device databases may include databases that are maintained by the wireless telecommunication carrier that operates the wireless communication network 106, databases that are maintained by a third-party device manufacturer, device databases that are maintained by a third-party device retailer, and/or so forth.

The solution module 216 may use decision algorithms to analyze the data that are obtained by the data input module 212 and the database interface module 214 with respect to a network coverage problem at a particular location. Accordingly, the solution module 216 may generate one or more recommended coverage solutions for remedying the network coverage problem. In various embodiment, the recommended coverage solutions may include implementation of Wi-Fi calling, distribution of Wi-Fi routers, selective installation of signal boosters, deployment of new small network cells, and/or so forth. In some embodiments, the solution module 216 may present multiple coverage solutions in a prioritized list.

The coverage solutions in the prioritized list may be ranked according to one or more considerations. The considerations may include solution effectiveness. Accordingly, a coverage solution (e.g., deployment of a signal booster) that is more likely to be more effective at a location than another coverage solution (e.g., implementation of Wi-Fi calling) may be prioritized higher on the list. The consideration may further include technical applicability. In one instance, a coverage solution may involve deploying a coverage device that supports device features that are available to a user device of a subscriber, as well as device features that are unavailable to the user device. However, the coverage device may nevertheless be ranked with a higher priority on the list than another coverage device of a different coverage solution that solely supports device features that are currently available to the user device. This may be due to the fact that those unavailable device features are likely to become industry supported norms in the near future. Alternative or concurrently, the currently supported device features may become obsolete within the predetermined time period. As a result, the subscriber is likely to acquire user devices that will support these currently unavailable device features.

The considerations may additionally include business variables. In one instance, the wireless telecommunication carrier may have acquired an inventory of devices that may be deployed as a part of a first coverage solution at a discounted rate. Such an inventory of devices may be less costly than another inventory of devices of an alternative but comparable second coverage solution. However, because the first coverage solution may be deployed with a less costly device, the solution module 216 may prioritize the first coverage solution over the second coverage solution in the prioritized list. Following the generation of coverage solutions, the solution module 216 may initiate the eligibility module 218 to determine whether the subscriber is eligible for the each of the coverage solutions.

The eligibility module 218 may determine whether a subscriber is eligible for the selected coverage solution. In various embodiments, the eligibility module 218 may determine the eligibility of the subscriber based on the account type and/or the payment history for the subscriber. For example, the eligibility module 218 may determine that the subscriber is ineligible if the account of the subscriber is a prepaid account instead of a postpaid account. In another example, the subscriber may be ineligible if the subscriber is delinquent in payments to the wireless telecommunication carrier for a predetermined amount of time, such as several months in a row.

Alternatively concurrently, the eligibility module 218 may determine the eligibility of the subscriber based on the implementation history of the coverage solutions. For example, if a coverage device of a coverage solution (e.g., a Wi-Fi router) has already been deployed at a location for the subscriber, the eligibility module 218 may determine that the subscriber is ineligible for another implementation of the same coverage solution. In another example, the eligibility module 218 may determine that a subscriber may be ineligible for a coverage solution if the coverage solution is already implemented for another subscriber at a location that is in proximity to the location of the subscriber. For instance, a small network cell (e.g., a femtocell, a picocell, etc.) may have already been deployed for another subscriber that lives in a neighboring residence to the residence of the subscriber. Since the deployment of a two small network cell in a confined area may cause mutual signal interference between the two cells, the eligibility module 218 may determine that the subscriber is ineligible for the coverage solution.

On the other hand, if the eligibility module 218 determines that a subscriber is eligible for a coverage solution, the eligibility module 218 may inform the solution module 216. In turn, the solution module 216 may display the coverage solution in an application user interface. In some instances, following a selection of a coverage solution via the application user interface, the solution module 216 may initiate a fulfillment of the coverage solution. The fulfillment may include changing network settings, implement configuration changes to make specific network and/or device features available to the subscriber, start a transaction process for the eventual delivery of a particular coverage device to the subscriber, and/or so forth.

In alternative embodiments, the solution module 216 may use the eligibility module 218 to determine whether a subscriber is eligibility for each of the one or more coverage solutions that are tailored for the subscriber following the presenting the solutions via an application user interface. In such embodiments, rather than omitting the presentation of a coverage solution for which the subscriber is ineligible, the solution module 216 may present the ineligible coverage solution in the application user interface with a reason or explanation for the ineligibility. Accordingly, the ineligible solution is not selectable for fulfillment from the application user interface.

The data output module 220 may generate the various application user interfaces that are configured to receive data inputs and display information to a user. The application user interfaces may include user interfaces that request user identification information, address information, user device information, etc., as well as application user interfaces that provide coverage solutions, pre-requisite conditions for coverage solution deployment, and/or reasons for eligibility or ineligibility.

The data store 222 may store information that are processed by the coverage solution engine 102. The information may include network parameters 116, device parameters 118, environment parameters 120, and operational parameters 122. The information may further include the coverage solution recommendations that are generated by the coverage solution engine 102. Additional details regarding the functionalities of the coverage solution engine 102 are discussed in the context of FIGS. 3-9. Thus, the coverage solution engine 102 may include other modules that perform the functionalities described in the context of these figures.

Example User Interface

Figure 3:
FIG. 3 is an illustrative user interface of a coverage solution engine that provides a prioritized solution list for remedying network coverage issues based on multiple input parameters.

FIG. 3 is an illustrative application user interface 300 of a coverage solution engine that provides a prioritized solution list for remedying network coverage problems based on multiple input parameters. The application user interface 300 may include a subscriber information portion 302, a device information portion 304, a questionnaire portion 306, and a solution portion 308.

The subscriber information portion 302 may display the identification information of a subscriber. For example, the subscriber information may include the name of the subscriber, account identification of the subscriber, and an account type of the subscriber. The device information portion 304 may provide information on the one or more user devices for which the subscriber is having network coverage problems. For example, the device information for a particular user device may include a device name, device model and manufacturer information, device identification information, and/or so forth. The device identification information may include an International Mobile Station Equipment Identity (IMEI), Mobile Equipment Identifier (MEID), Integrated Circuit Card ID (ICCID), and/or Electronic Serial Number (ESN). In various embodiments, the information in the subscriber information portion 302 and the device information portion 304 may include information that is manually inputted and/or retrieved from the network databases 224.

The questionnaire portion 306 may enable the input of the device parameters 118 and/or the environment parameters 120 into the coverage solution engine 102. For example, the information may include an address at which the subscriber is experience network coverage problems, whether Internet, Wi-Fi, or a carrier signal is available at the address, and/or so forth. The solutions portion 308 may list the one or more coverage solutions that are recommend for the subscriber. For each recommend coverage solution, the solutions portion 308 may display a description of the solution, an indication of whether the subscriber is eligible for the solution, prerequisites for implementing the coverage solution, and/or devices that are excluded from using the coverage solution. In an instance in which the subscriber is ineligible for a coverage solution that resolves the network coverage problem, the solutions portion 308 may display one or more reasons for the ineligibility.

Example Processes

FIGS. 4-9 present illustrative processes 400-900 for using a coverage solution recommendation tool to recommend one or more coverage solutions that remedy a network coverage problem. Each of the processes 400-900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-900 are described with reference to the architecture 100 of FIG. 1.

Figure 4:
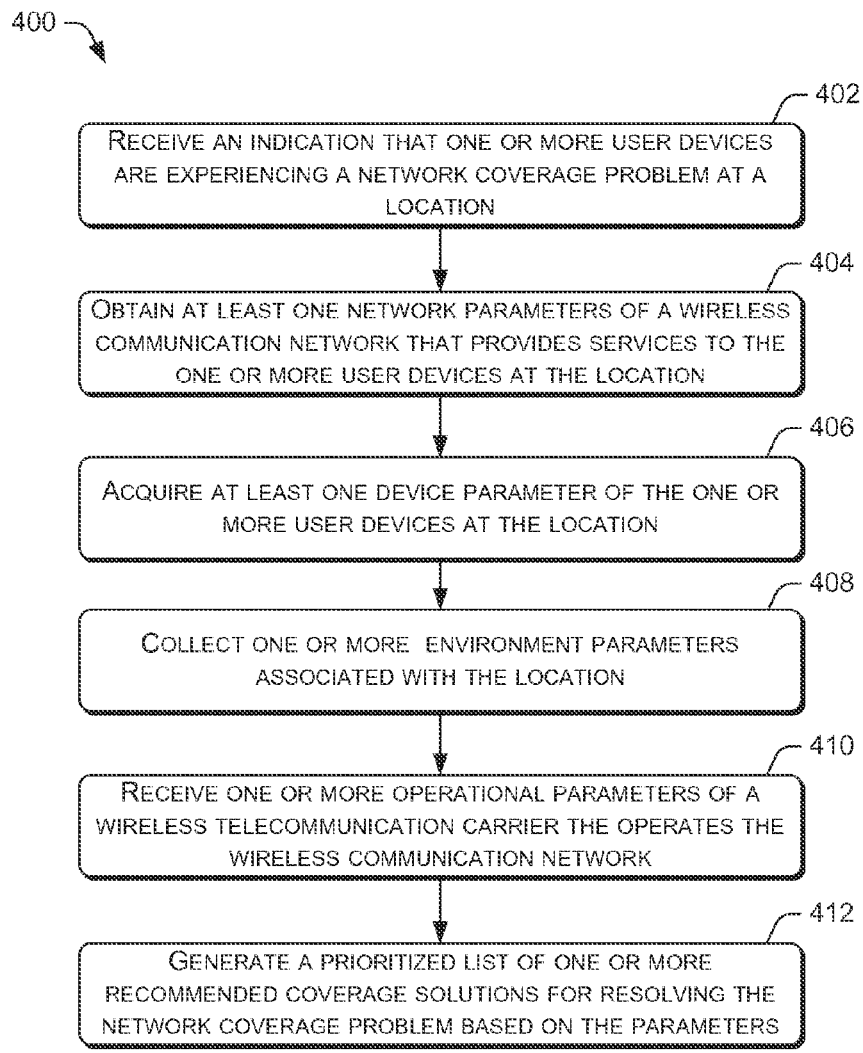
FIG. 4 is a flow diagram of an example process for generating a prioritized solution list for remedying network coverage issues based on multiple input parameters.

FIG. 4 is a flow diagram of an example process 400 for generating a prioritized solution list for remedying network coverage problems based on multiple input parameters. At block 402, the coverage solution engine 102 may receive an indication that one or more user devices are experiencing a network coverage problem at a location. The network coverage problem may result in an inability to use the one or more user devices to complete calls, dropped calls, slow data download or upload, and/or so forth. The location may be a residential address, a business address, a set of geographical coordinates, and/or the like.

At block 404, the coverage solution engine 102 may obtain at least one network parameter of a wireless communication network that provides services to the one or more user devices at the location. The services may include telecommunication and data communication services. In various embodiments, the network parameters may include parameters that affect the deployment of the services to the location by the wireless telecommunication carrier. For example, the network parameters may include the availability of spectrum licenses at the location, the availability of a PSAP for the location, the types of telecommunication carrier network signals that cover the location, and/or so forth.

At block 406, the coverage solution engine 102 may acquire at least one device parameter of one or more user devices at the location. The one or more user devices may be experiencing a network coverage problem at the location. In various embodiments, the device parameters may include features and specification of the one or more user devices. For example, the device parameters may include whether a user device is capable of more than 2G telecommunication, whether a user device is a LTE-compatible device, whether a user device is capable of Wi-Fi calling, and/or so forth.

At block 408, the coverage solution engine 102 may collect one or more user environment parameters associated with the location. The environment parameters may include environmental variables that impact whether the wireless telecommunication carrier is able to leverage additional coverage solutions to provide telecommunication or data communication services at the location. For example, the environmental parameters may include whether access to the Internet is available at the location, whether there is sufficient Wi-Fi coverage at the location, the presence or absence of pre-existing deployed small network cells proximate to the location, and/or so forth.

At block 410, the coverage solution engine 102 may receive one or more operational parameters of a wireless telecommunication carrier that operates the wireless communication network. The operational parameters may include consideration that relate to the business operations of the telecommunication carrier that operates the wireless communication network. For example, the operational parameters may include the inventory quantities of devices that can be used to provide the coverage solutions, the profit or cost savings generated from the deployment of each coverage solution, whether a particular version of such a device may be substitute by another version of the device, the technical longevity of each coverage solution device, and/or so forth.

At block 412, the coverage solution engine 102 may generate a prioritized list of one or more recommended coverage solutions for resolving the network coverage problem based on the parameters. In various embodiments, the prioritized list may provide the user with an optimal coverage solution, as well as access to alternative coverage solutions in the event the user elects to forego the optimal coverage solution. In some alternative embodiments, the coverage solution engine 102 may determine the prioritized list without receiving and using the one or more operational parameters of the wireless telecommunication carrier.

Figure 5:
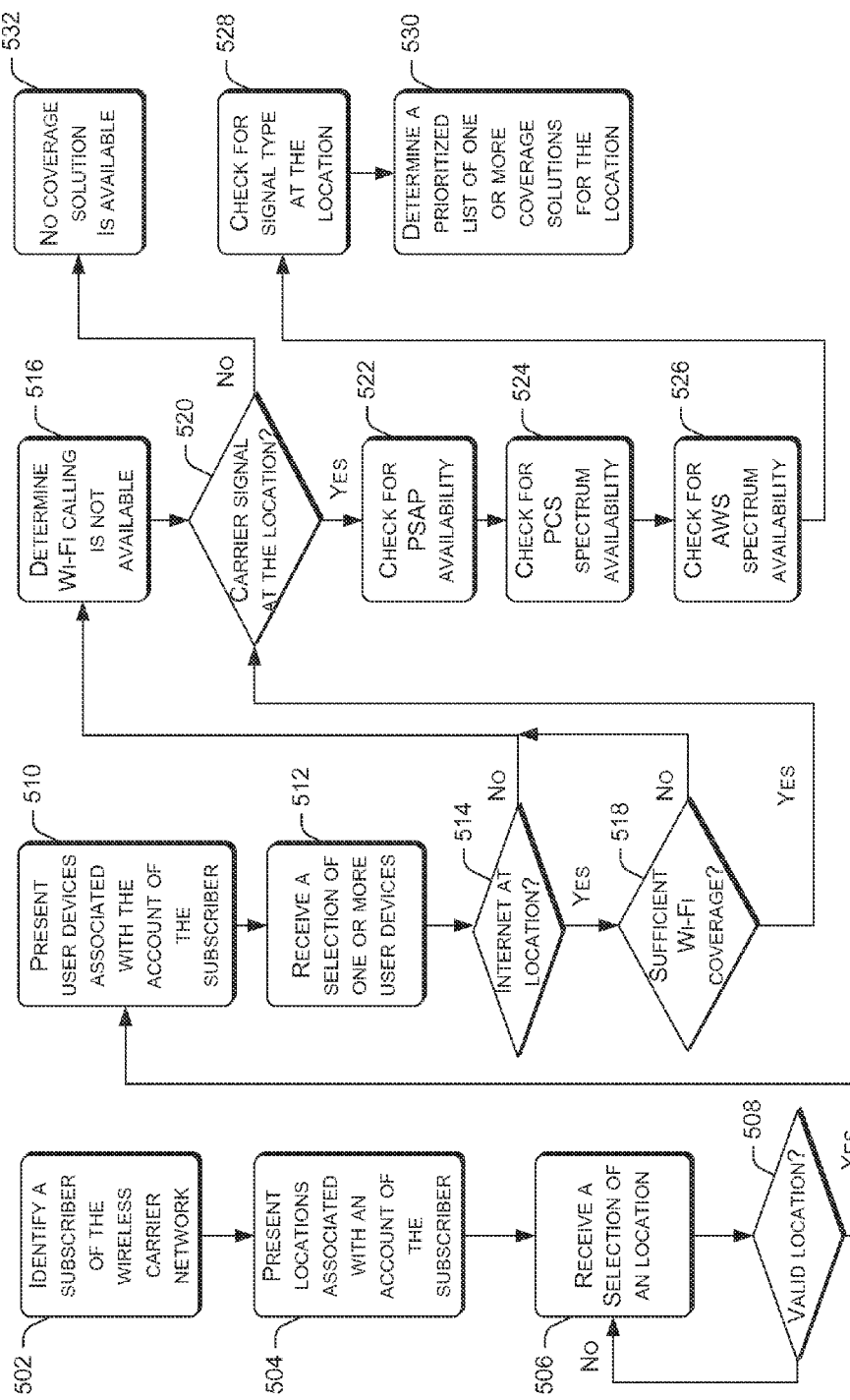
FIG. 5 is a flow diagram of an example process for determining a priority order of coverage solution recommendations.

FIG. 5 is a flow diagram of an example process 500 for determining a priority order of coverage solution recommendations. The process 500 may further illustrate the block 412 of the process 400. At block 502, the solution module 216 may identify a subscriber of a wireless carrier network. The solution module 216 may identify subscriber the based on information received from the subscriber, such as a name, Mobile Station International Subscriber Directory Number (MSISDN), an account number, a password, a personal identification number (PIN), and/or other authentication credentials.

At block 504, the solution module 216 present one or more locations (e.g., addresses) that are associated with an account of the subscriber. The one or more locations may be presented via an application user interface of the solution module 216. In various embodiments, the solution module 216 may retrieve the location information from a subscriber database. At block 506, the solution module 216 may receive a selection of a location that is inputted via the application user interface. The selection of the location may be inputted into the solution module 216 by a subscriber or a customer service representative that is assisting the subscriber. In alternative embodiments, the solution module 216 may receive a direct input of a location that is supplied by a subscriber instead of a selection of a location that is associated with the account of the subscriber.

At decision block 508, the solution module 216 may validate the location. In various embodiments, the validation may be performed to ensure that the location is for a location that is serviced by the wireless communication network 106. Thus, if the solution module 216 determines that the location is invalid ("no" at decision block 508), the process 500 may loop back to block 506 so that another location may be selected or inputted. However, if the solution module 216 determines that the location is valid ("yes" at decision block 508), the process 500 may proceed to block 510.

At block 510, the solution module 216 may present one or more user devices that are associated with the account of the subscriber. The one or more user devices may be presented via an application user interface of the solution module 216. Each user device may be configured to use the telecommunication and/or data communication services that are provided by the wireless communication network 106. The solution module 216 may retrieve the information regarding each of the user devices from a device database that is accessible to the solution module 216. At block 512, the solution module 216 may receive a selection of one or more user devices. The selection may be received via the application user interface of the solution module 216.

At decision block 514, the solution module 216 may determine whether there is Internet availability at the location. Accordingly, if there is no Internet at the location ("no"

at decision block 514), the process 400 may proceed to block 516. At block 516, the solution module 216 may determine that Wi-Fi calling is not available as a coverage solution for the location.

However, if there is Internet at the location ("yes" at decision block 514), the process 500 may continue to decision block 518. At decision block 518, the solution module 216 may determine whether there is sufficient Wi-Fi coverage at the location. In some embodiments, the sufficiency of the Wi-Fi coverage may be a subjective measurement. For example, the subscriber may be queried as to whether there is "good" Wi-Fi coverage at the location. If the answer is there is "good" Wi-Fi, then an indication of the sufficient Wi-Fi coverage may be inputted into the solution module 216.

In other embodiments, the sufficiency of the Wi-Fi coverage may be an objective measure. For example, the subscriber may be queried as to whether the Wi-Fi signal that provides the Wi-Fi coverage at the location meets a predetermined signal strength, a predetermined signal quality threshold, or supports a predetermined download and/or upload speed. If the answer is that the Wi-Fi signal meets a predetermined signal strength, a predetermined signal quality threshold, or supports a predetermined download and/or upload speed, then an indication of the sufficient Wi-Fi coverage may be inputted into the solution module 216. Thus, at decision block 518, if the solution module 216 determines that there is insufficient Wi-Fi coverage at the location ("no" at decision block 518), the process 500 may once again proceed to block 516. Once the solution module 216 determines that Wi-Fi calling is not available as a coverage solution for the location, the process 500 may proceed to decision block 520. However, if the solution module 216 determines that there is sufficient Wi-Fi coverage at the location ("yes" at decision block 518), the process 500 may proceed directly to decision block 520.

At decision block 520, the solution module 216 may determine whether there is a carrier signal of the wireless communication network 106 at the location. The availability of the carrier signal may be determined based on data from an engineering database. In various embodiments, the solution module 216 may determine that a carrier signal is available if the signal robustness of the carrier signal is above a predetermined robustness threshold at the location. Thus, at decision block 520, if the solution module 216 determines that the carrier signal is available at the location ("yes" at decision block 520), the process 500 may proceed to block 522. At block 522, the solution module 216 may check for PSAP availability at the location. The availability of the PSAP means that the emergency services may be automatically informed of the location if an emergency service call is initiated using a user device at or in the vicinity of the location. The availability of the PSAP may be a regulatory prerequisite for the deployment of some coverage solutions at the location.

At block 524, the solution module 216 may determine whether a PCS spectrum is available at the location. The availability of the PCS spectrum may be dependent on whether the wireless telecommunication carrier that operates the wireless communication network 106 has a government issued license to deploy the PCS spectrum in a region that encompasses the location. Accordingly, the solution module 216 may determine that the PCS spectrum is unavailable if the wireless telecommunication carrier has no government issued license to deploy the PCS spectrum. In various embodiments, the solution module 216 may make the determination based on data retrieved from an engineering database.

At block 526, the solution module 216 may determine whether an AWS spectrum is available at the location. The availability of the AWS spectrum may be dependent on whether the wireless telecommunication carrier that operates the wireless communication network 106 has a government issued license to deploy the AWS spectrum in a region that encompasses the location. Accordingly, the solution module 216 may determine that the AWS spectrum is unavailable if the wireless telecommunication carrier has no government issued license to deploy the AWS spectrum. In various embodiments, the solution module 216 may make the determination based on data retrieved from an engineering database.

At block 528, the solution module 216 may check for the signal type of the carrier signal at the location. Accordingly, the solution module 216 may determine whether the carrier signal is a 2G signal, a PCS signal, an AWS signal, and/or so forth. In various embodiments, the solution module 216 may make the determination based on data retrieved from an engineering database. The type of the carrier signal may affect whether some coverage solutions are available at the location.

At block 530, the solution module 216 may determine a prioritized list of one or more coverage solutions for resolving the network coverage problem at the location. In various embodiments, the recommended coverage solutions may include implementation of Wi-Fi calling, distribution of new Wi-Fi routers, selective installation of signal boosters, deployment of new small network cells, and/or so forth. Returning to decision block 520, if the solution module 216 determines that the carrier signal is not available at the location ("no" at decision block 520), the process 500 may proceed to block 532. At block 532, the solution module 216 may determine that no coverage solution for resolving the network coverage problem at the location is available.

Figure 6:
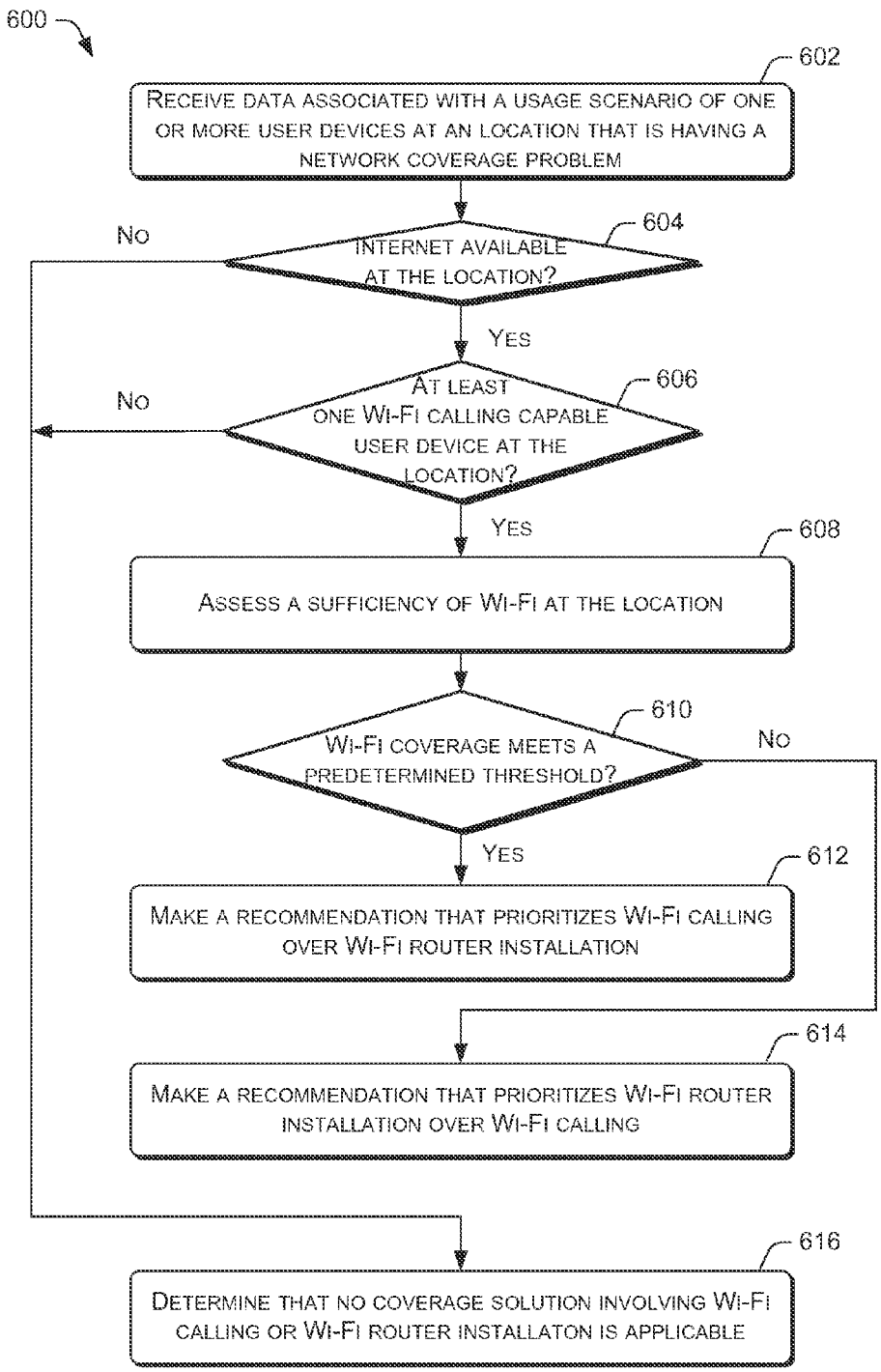
FIG. 6 is a flow diagram of an example process for determining the applicability of Wi-Fi router based solutions to solve a network coverage problem.

FIG. 6 is a flow diagram of an example process 600 for determining the applicability of Wi-Fi router based solutions to solve a network coverage problem. The process 600 may further illustrate the block 530 of the process 500. At block 602, the solution module 216 may receive data associate with one or more user devices at a location (e.g., an address). The one or more user devices may be experiencing a network coverage problem at the location. In various embodiments, the data may include network parameters 116, device parameters 118, and environment parameters 120.

At decision block 604, the solution module 216 may determine whether the Internet available at the location. According, if the Internet is available at the location ("yes" at decision block 604), the process 600 may proceed to decision block 606. At decision block 606, the solution module 216 may determine whether at least one Wi-Fi calling capable user device is used at the location. Thus, if at least one Wi-Fi calling capable user device is used at the location ("yes" at decision block 606), the process 600 may proceed to block 608.

At block 608, the solution module 216 may assess a sufficiency of Wi-Fi at the location. In various embodiments, the sufficiency of the Wi-Fi may be assessed on a subjective or objective basis. For example, the subscriber may be queried as to whether there is "good" Wi-Fi coverage at the location. The subjective standard of "good" being used as a predetermined threshold. In another example, the subscriber may be queried as to whether the Wi-Fi signal that provides the Wi-Fi coverage at the location meets a predetermined signal strength, a predetermined signal quality threshold, or a predetermined upload and/or download speed threshold. Thus, at decision block 610, if the solution module 216 determines that the Wi-Fi sufficiency meets a predetermined threshold ("yes" at decision block 610), the process 600 may proceed to block 612. At block 612, the solution module 216 may make a recommendation of coverage solutions that includes the prioritization of an implementation of Wi-Fi calling at the location over an installation of a Wi-Fi router at the location.

However, if the solution module 216 determines that the Wi-Fi sufficiency does not meet a predetermined threshold ("no" at decision block 610), the process 600 may proceed to block 614. At block 614, the solution module 216 may recommend coverage solutions that includes the prioritization of the installation of a Wi-Fi router at the location over the implementation of Wi-Fi calling at the location.

Returning to decision block 604, if the Internet is unavailable at the location ("no" at decision block 604), the process 600 may proceed to block 616. At block 616, the solution module 216 may determine that the no coverage solution that involves Wi-Fi calling or Wi-Fi router installation is applicable. Likewise, returning to decision block 606, if the solution module 216 determine that no Wi-Fi calling capable user device is used at the location ("yes" at decision block 606), the process 600 may also proceed to block 616.

Figure 7:
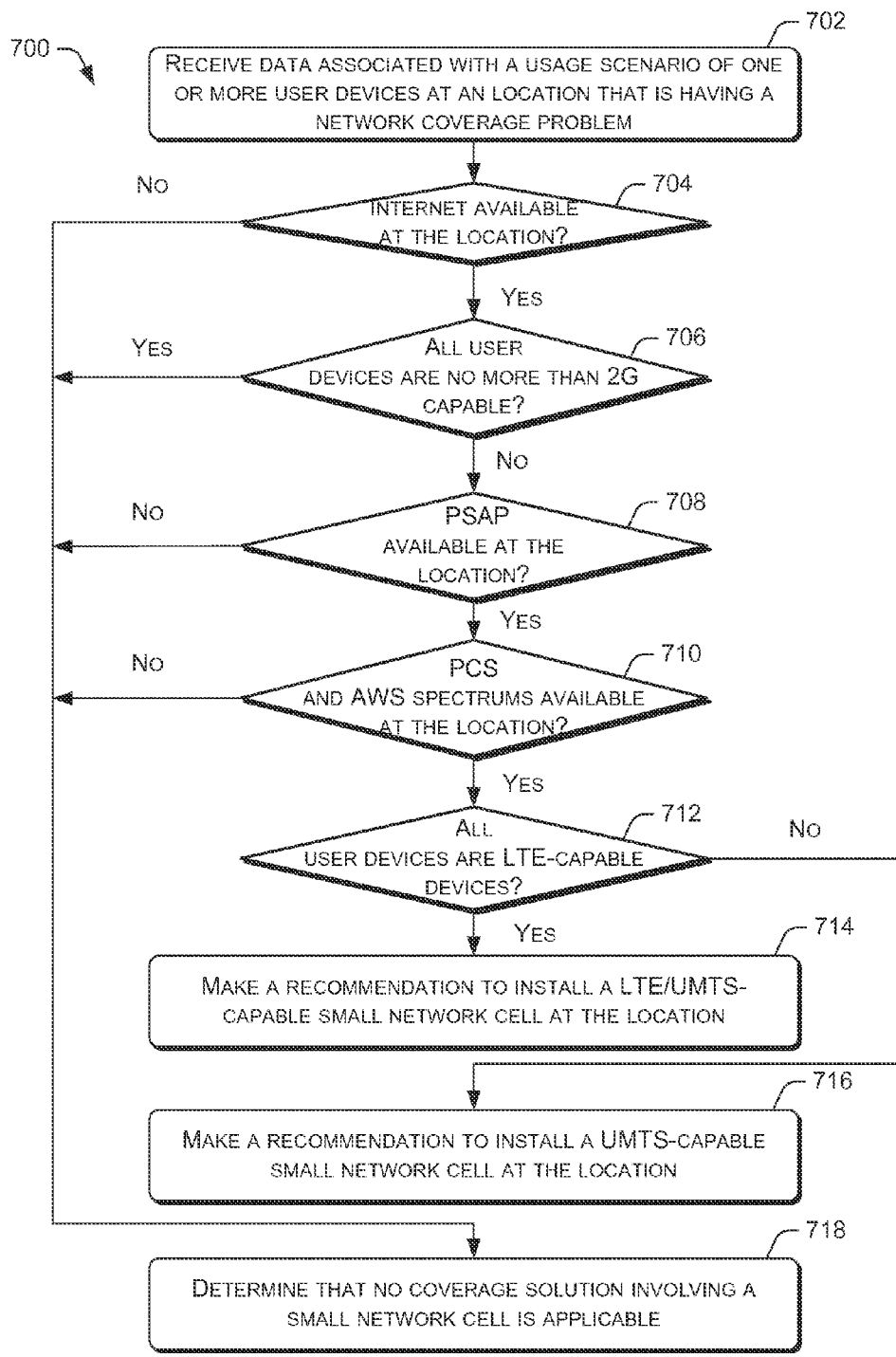
FIG. 7 is a flow diagram of an example process for determining the applicability of small network cell based solutions to solve a network coverage problem.

FIG. 7 is a flow diagram of an example process 700 for determining the applicability of small network cell based solutions to solve a network coverage problem. The process 700 may further illustrate the block 530 of the process 500. At block 702, the solution module 216 may receive data associate with one or more user devices at a location (e.g., an address). The one or more user devices may be experiencing a network coverage problem at the location. In various embodiments, the data may include network parameters 116, device parameters 118, and environment parameters 120.

At decision block 704, the solution module 216 may determine whether the Internet available at the location. According, if the Internet is available at the location ("yes" at decision block 704), the process 700 may proceed to decision block 706. At decision block 706, the solution module 216 may determine whether all of the one or more user devices are no more than 2G capable. In various embodiments, the solution module 216 may make the determination based on data retrieved from a device database. Accordingly, if the solution module 216 determines that at least one of the user devices is more than 2G capable ("no" at decision block 706), the process 700 may proceed to decision block 708.

At decision block 708, the solution module 216 may determine whether PSAP is available at the location. In various embodiments, the availability of the PSAP means that the emergency services may be automatically informed of the location if an emergency service call is initiated using a user device at or in the vicinity of the location. The solution module 216 may make the determination based on data retrieved from an engineering database. Thus, if the solution module 216 determines that PSAP is available at the location ("yes" at decision block 708), the process 700 may proceed to decision block 710.

At decision block 710, the solution module 216 may determine whether PCS and AWS spectrums are available at the location. In various embodiments, the availability of a spectrum may be dependent on whether the wireless telecommunication carrier that operates the wireless communication network 106 has a government issued license to deploy the spectrum in a region that encompasses the location. Accordingly, if the solution module 216 determines that PCS and AWS spectrums are available at the location ("yes" at decision block 710), the process 700 may continue to decision block 712.

At decision block 712, the solution module 216 may determine whether all of the one or more user devices are LTE-capable devices. Thus, if the all of the user devices are LTE-capable ("yes" at decision block 712), the process 700 may proceed to block 714. At block 714, the solution module 216 may make a recommendation to install a LTE/Universal Mobile Telecommunications System (UMTS)-capable small network cell at the location. However, if not all of the user devices are LTE-capable ("no" at decision block 712), the process 700 may proceed to block 716. At block 716, the solution module 216 may make a recommendation to install an UMTS-capable small network cell at the location.

Returning to decision block 704, if the Internet is unavailable at the location ("no" at decision block 704), the process 700 may proceed to block 718. At block 718, the solution module 216 may determine that no coverage solution involving small network cell is applicable in resolving the network coverage problem at the location. Returning to decision block 706, if the solution module 216 determines that all of the user devices are no more than 2G capable, ("yes" at decision block 706), the process 700 may proceed directly to block 718. Returning to decision block 708, if the solution module 216 determines that PSAP is unavailable at the location ("no" at decision block 708), the process 700 may proceed directly to block 718. Likewise, returning to decision block 710, if the solution module 216 determines that PCS and AWS spectrums are unavailable at the location ("no" at decision block 710), the process 700 may proceed directly to block 718.

Figure 8:
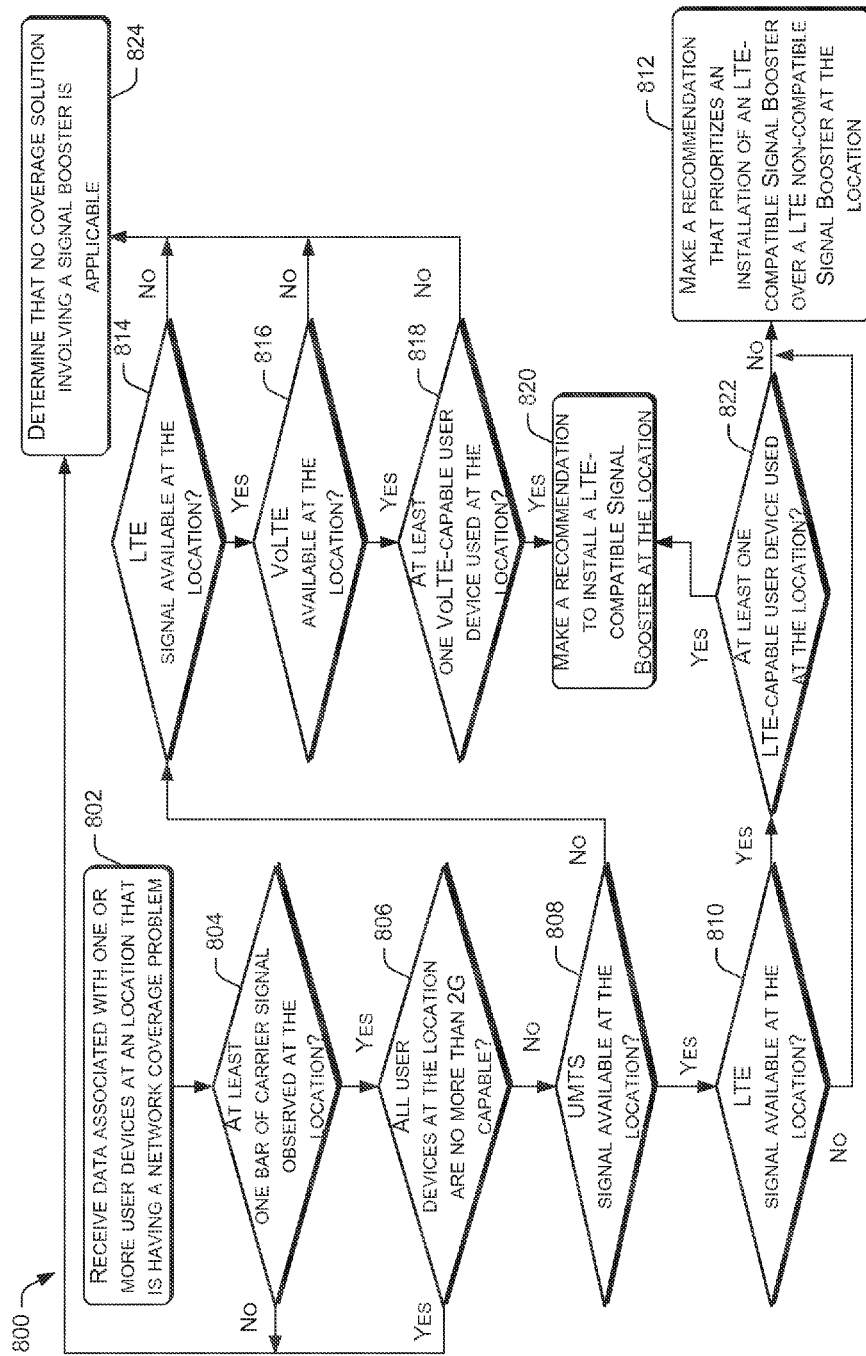
FIG. 8 is a flow diagram of an example process for determining the applicability of signal booster based solutions to solve a network coverage problem.

FIG. 8 is a flow diagram of an example process 800 for determining the applicability of signal booster based solutions to solve a network coverage problem. The process 800 may further illustrate the block 530 of the process 500. At block 802, the solution module 216 may receive data associate with one or more user devices at a location (e.g., an address). The one or more user devices may be experiencing a network coverage problem at the location. In various embodiments, the data may include network parameters 116, device parameters 118, and environment parameters 120.

At decision block 804, the solution module 216 may determine whether at least one bar of carrier signal is available at the location. In some embodiments, the solution module 216 may make the determination based on network coverage data from an engineering database. In other embodiments, the solution module 216 may use an input from a user to make the determination. Accordingly, if the solution module 216 determines that at least one bar of carrier signal is available at the location ("yes" at decision block 804), the process 800 may proceed to decision block 806.

At decision block 806, the solution module 216 may determine whether all of the one or more user devices are no more than 2G capable. The solution module 216 may make the determination based on data retrieved from a device database. Accordingly, if at least one of the user devices is more than 2G capable ("no" at decision block 806), the process 800 may proceed to decision block 808.

At decision block 808, the solution module 216 may determine whether an UMTS signal is available at the location. The solution module 216 may make the determination based on data retrieved from the engineering database. Accordingly, if the UMTS signal is available at the location ("yes" at decision block 808), the process 800 may proceed to decision block 810. At decision block 810, the solution module 216 may determine whether a LTE signal is available at the location. The solution module 216 may make the determination based on data retrieved from the engineering database. Accordingly, if the LTE signal is unavailable at the location ("no" at decision block 810), the process may proceed to block 812. At block 812, the solution module 216 may make a recommendation that prioritizes the installation an LTE-compatible signal booster over a LTE non-compatible signal booster.

Returning to decision block 808, if the UMTS signal is unavailable at the location ("no" at decision block 808), the process 800 may proceed to decision block 814. At decision block 814, the solution module 216 may determine whether a LTE signal is available at the location. The solution module 216 may make the determination based on data retrieved from the engineering database. Accordingly, if the LTE signal is available at the location ("yes" at decision block 814), the process may proceed to decision block 816.

At decision block 816, the solution module 216 may determine whether Voice over LTE (VoLTE) is available at the location. The solution module 216 may make the determination based on data retrieved from the engineering database. Accordingly, if the solution module 216 determines that VoLTE is available at the location ("yes" at decision block 816), the process 800 may proceed to decision block 818.

At decision block 818, the solution module 216 may determine whether at least one VoLTE user device is being used at the location. The solution module 216 may make the determination based on data retrieved from a device database. Accordingly, if at least one VoLTE-capable user device is used at the location ("yes" at decision block 818), the process 800 may proceed to block 820. At block 820, the solution module 216 may make a recommendation to install a LTE-compatible signal booster at the location.

Returning to decision block 810, if the LTE signal is available at the location ("yes" at decision block 810), the process may proceed to decision block 822. At decision block 822, the solution module 216 may determine whether at least one LTE-capable user device is being used at the location. The solution module 216 may make the determination based on data retrieved from a device database. Accordingly, if at least one LTE-capable user device is used at the location ("yes" at decision block 822), the process 800 may proceed to block 820. However, if no LTE-capable user device is used at the location ("no" at decision block 822), the process 800 may proceed to block 812.

Returning to decision block 804, if the solution module 216 determines that no bars of carrier signal is available at the location ("no" at decision block 804), the process 800 may proceed to block 824. At block 824, the solution module 216 may determine that no coverage solution involving a signal booster is applicable. Likewise, returning to decision block 806, if all of the user devices are no more than 2G capable ("yes" at decision block 806), the process 800 may once again proceed to block 824.

Returning to decision block 814, if the LTE signal is unavailable at the location ("no" at decision block 814), the process may proceed to block 824. Further, returning to decision block 816, if the solution module 216 determines that VoLTE is unavailable at the location ("no" at decision block 816), the process 800 may also proceed block 824. Likewise, returning to decision block 818, if no VoLTE-capable user device is used at the location ("no" at decision block 818), the process 800 may further proceed to block 824.

Figure 9:
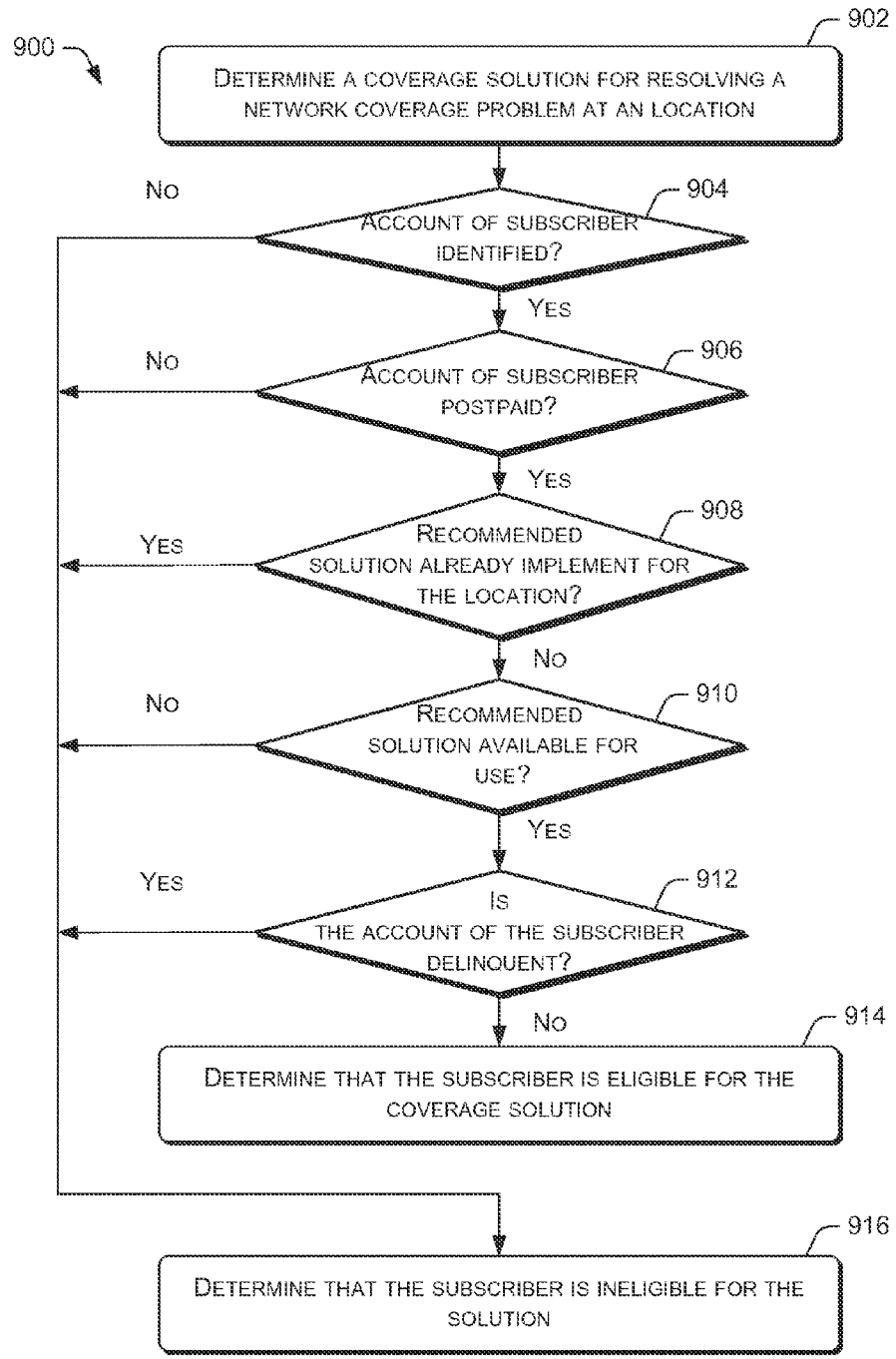
FIG. 9 is a flow diagram of an example process for determining an eligibility of a user with respect to recommended solutions that remedy network coverage problems.

FIG. 9 is a flow diagram of an example process 900 for determining an eligibility of a user with respect to recommended solutions that remedy network coverage problems. At block 902, the coverage solution engine 102 may determine a coverage solution for resolving a network coverage problem at a location (e.g., an address). In various embodiments, the coverage solution may be determined by the solution module 216 of the coverage solution engine 102. The coverage solution may include the configuration of a software application on a user device, or the deployment of a solution device (e.g., a signal booster, a replace Wi-Fi router, etc.).

At decision block 804, the eligibility module 218 may determine whether the account of the user was identified. In various embodiments, the identification of the account may include the user provide one or more authentication credentials for authenticating that the user is associated with the account. According, if the user account is identified ("yes" at decision block 904), the process 900 may proceed to decision block 906.

At decision block 906, the eligibility module 218 may determine whether the account of the user is a postpaid account. The eligibility module 218 may make the determination based on data retrieved from the subscriber database. In various embodiments, only a user with a postpaid account is eligible for a coverage solution that is recommended by the coverage solution engine 102. Accordingly, if the eligibility module 218 determines that the user account is a postpaid account ("yes" at decision block 906), the process 900 may proceed to decision block 908.

At decision block 908, the eligibility module 218 may determine whether the recommended solution is already implemented for the location. The eligibility module 218 may make the determination based on data retrieved from the subscriber database. For example, the subscriber may already have a signal booster deployed at the location. In another example, the subscriber may already have Wi-Fi calling implemented on their user device. Accordingly, if the recommended solution has not yet been implemented for the location ("no" at decision block 908), the process 900 may proceed to decision block 910.

At decision block 910, the eligibility module 218 may determine whether the recommend coverage solution is available for use at the location. The eligibility module 218 may make the determination based on data retrieved from the subscriber database. For example, a neighboring location may already have a small network cell deployed to resolve a corresponding network coverage problem. Since the deployment of another small network cell may cause signal interference, the eligibility module 218 may determine that the recommended coverage solution is unavailable for use. Accordingly, if the recommend coverage solution is available for use at the location ("yes" at decision block 910), the process 900 may proceed to decision block 912.

At decision block 912, the eligibility module 218 may determine whether the account of the subscriber is delinquent. The eligibility module 218 may make the determination based on data retrieved from the subscriber database. Accordingly, if the account of the subscriber is not delinquent ("no" at decision block 912), the process 900 may proceed to block 914. At block 914, the coverage solution engine 102 may determine that the subscriber is eligible for the coverage solution. Accordingly, the coverage solution engine 102 may present the coverage solution to the subscriber for selection. In various embodiments, the coverage solution may be presented via an application user interface that is generated by the coverage solution engine 102. A selection of the coverage solution may cause the coverage solution engine 102 to initiate a fulfillment of the coverage solution. For example, the fulfillment may include the initiation of a software application modification on a user device or shipment of a solution device (e.g., signal booster) to the subscriber for installation at the location.

Returning to decision block 904, if the user account is not identified ("no" at decision block 904), the process 900 may proceed to block 916. At block 916, the eligibility module 218 of the coverage solution engine 102 may determine that the subscriber is ineligible for the coverage solution. Returning to decision block 906, if the user account is not a postpaid account ("no" at decision block 906), the process 900 may proceed to block 916. Returning to decision block 908, if the recommended solution is already implemented for the location ("yes" at decision block 908), the process 900 may proceed to block 916. Returning to decision block 910, if the solution is unavailable for use ("no" at decision block 910), the process 900 may proceed to block 916. Returning to decision block 912, if the account of the subscriber is delinquent ("yes" at decision block 912), the process 900 may also proceed to block 916.

The coverage solution recommendation tool may generate prioritized lists of coverage solutions by taking into account multiple operational considerations, network parameters and device features, as well as environmental variables that are otherwise difficult for a customer service representative to analyze in an expedient and coherent manner. The use of the coverage solution recommendation tool may enable customer service representatives to quickly and easily provide coverage solutions for network coverage problems experienced by subscribers. Thus, the coverage solution recommendation tool may reduce the durations of customer service support calls, increase customer satisfaction and retention, and generate higher revenue for wireless telecommunication carriers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    obtaining at least one network parameter of a wireless communication network that provides services to one or more user devices at a location, the one or more user devices experiencing a network coverage problem at the location;
    acquiring at least one device parameter of the one or more user devices being used at the location;
    collecting one or more environment parameters associated with the location, the one or more environment parameters affecting whether a wireless telecommunication carrier is able to leverage additional coverage solutions to provide the services at the location;
    receiving a list of one or more coverage solutions, at least one coverage solution of the list comprises implementing Wi-Fi calling for the one or more user devices and an installation of a Wi-Fi router that supports Wi-Fi calling at the location; and
    prioritizing the list of one or more coverage solutions to generate a prioritized list of one or more coverage solutions for resolving the network coverage problem at the location based at least on a plurality of parameters, wherein the plurality of parameters include the at least one network parameter, the at least one device parameter, and the one or more environment parameters, and wherein at least one of the one or more coverage solutions provides additional network coverage to the one or more user devices utilizing unlicensed spectrum.

2. The one or more non-transitory computer-readable media of claim 1, wherein the acts further comprise receiving one or more operational considerations of the wireless telecommunication carrier, and wherein the plurality of parameters further includes the operational considerations of the wireless telecommunication carrier.

3. The one or more non-transitory computer-readable media of claim 2, wherein the one or more operational considerations include an inventory quantity of a device for providing a coverage solution, a profit or a cost savings generated from a deployment of the coverage solution, whether a particular version of the device is interchangeable with another version of the device, or a technical longevity of the device.

4. The one or more non-transitory computer-readable media of claim 1, wherein the acts further comprise determining that a subscriber associated with the one or more user devices is eligible for the one or more coverage solutions in response to one or more conditions being satisfied, the one or more conditions including that an account of the subscriber is a postpaid account, the account of the subscriber is non-delinquent, the one or more coverage solutions are available for use at the location, and the one or more coverage solutions are not previously implemented for the location.

5. The one or more non-transitory computer-readable media of claim 4, wherein a coverage solution in a form of a deployment of a small network cell is available for use at the location when no pre-existing small network cell is deployed for a different subscriber at another location that is within a predetermined distance of the location.

6. The one or more non-transitory computer-readable media of claim 1, wherein the one or more coverage solutions further include an installation of a signal booster at the location, or a deployment of a small network cell at the location.

7. The one or more non-transitory computer-readable media of claim 1, wherein the at least one network parameter includes an availability of one or more spectrum licenses at the location, an availability of a public-safety access point (PSAP) for the location, or a type of telecommunication carrier network signal that cover the location.

8. The one or more non-transitory computer-readable media of claim 1, wherein the at least one device parameter includes whether a user device is capable of more than Second Generation (2G) telecommunication, whether the user device is a Long-Term Evolution (LTE)-compatible device, or whether the user device is capable of Wi-Fi calling.

9. The one or more non-transitory computer-readable media of claim 1, wherein the one or more environment parameters include whether Internet access is available at the location, whether a sufficiency of Wi-Fi coverage at the location meets a predetermined sufficiency threshold, or whether a pre-existing deployed small network cell is present proximate to the location.

10. The one or more non-transitory computer-readable media of claim 1, wherein the generating includes prioritizing an implementation of Wi-Fi calling for the one or more user devices over an installation of a Wi-Fi router that supports Wi-Fi calling at the location in response to a sufficiency of Wi-Fi coverage at the location meeting a predetermined sufficiency threshold, or prioritizing the installation of the Wi-Fi router over the implementation of Wi-Fi calling in response to the sufficiency of Wi-Fi coverage failing to meet the predetermined sufficiency threshold.

11. The one or more non-transitory computer-readable media of claim 1, wherein the generating includes recommending an installation of a Long-Term Evolution (LTE)/Universal Mobile Telecommunications System (UMTS)-capable small network cell at the location at least in response to a determination that each of the one or more user devices are LTE-capable user devices, or recommending an installation of a UMTS-capable small network cell at the location at least in response to a determination that at least one of the one or more user devices is not a LTE-capable user device.

12. The one or more non-transitory computer-readable media of claim 1, wherein the generating includes recommending an installation of a Long-Term Evolution (LTE)-compatible signal booster at the location at least in response to a determination that at least one of the one or more user devices is a LTE-capable user device or a Voice over LTE (VoLTE)-capable user device, prioritizing an installation of a LTE-compatible signal booster over an installation of a LTE non-compatible signal booster at least in response to a determination that none of the one or more user devices is a LTE-capable user device, or determining that no coverage solution involving a signal booster is applicable at least in response to a determination that none of the one or more user devices is a VoLTE-capable device.

13. A computer-implemented method, comprising:
    obtaining at least one network parameter of a wireless communication network that provides services to one or more user devices at a location, the one or more user devices experiencing a network coverage problem at the location;
    acquiring at least one device parameter of the one or more user devices being used at the location;
    collecting one or more environment parameters associated with the location, the one or more environment parameters affecting whether a wireless telecommunication carrier is able to leverage additional coverage solutions to provide the services at the location;
    receiving one or more operational parameters of the wireless telecommunication carrier;
    receiving a list of one or more coverage solutions, at least one coverage solution of the list comprises implementing Wi-Fi calling for the one or more user devices and an installation of a Wi-Fi router that supports Wi-Fi calling at the location; and
    prioritizing the list of one or more coverage solutions to generate a prioritized list of one or more recommended coverage solutions for resolving the network coverage problem at the location based at least on a plurality of parameters, wherein the plurality of parameters include at least one of the at least one network parameter, the at least one device parameter, the one or more environment parameters, or the one or more operational parameters, and wherein at least one of the one or more recommended coverage solutions provides additional network coverage to the one or more user devices utilizing unlicensed spectrum.

14. The computer-implemented method of claim 13, further comprising determining that a subscriber associated with the one or more user devices is eligible for the one or more recommended coverage solutions in response to one or more conditions being satisfied, the one or more conditions including that an account of the subscriber is a postpaid account, the account of the subscriber is non-delinquent, the one or more recommended coverage solutions are available for use at the location, and the one or more recommended coverage solutions are not previously implemented for the location.

15. The computer-implemented method of claim 13, wherein the one or more recommended coverage solutions further include an installation of a signal booster at the location, or a deployment of a small network cell at the location.

16. The computer-implemented method of claim 13, wherein the at least one network parameter includes an availability of one or more spectrum licenses at the location, an availability of a public-safety access point (PSAP) for the location, or a type of telecommunication carrier network signal that cover the location.

17. The computer-implemented method of claim 13, wherein the at least one device parameter includes whether a user device is capable of more than Second Generation (2G) telecommunication, whether the user device is a Long-Term Evolution (LTE)-compatible device, or whether the user device is capable of Wi-Fi calling.

18. The computer-implemented method of claim 13, wherein the one or more environment parameters include whether Internet access is available at the location, whether a sufficiency of Wi-Fi coverage at the location meets a predetermined sufficiency threshold, or whether a pre-existing deployed small network cell is present proximate to the location.

19. The computer-implemented method of claim 13, wherein the one or more operational parameters include an inventory quantity of a device for providing a coverage solution, a profit or a cost savings generated from a deployment of the coverage solution, whether a particular version of the device is interchangeable with another version of the device, or a technical longevity of the device.

20. A system, comprising:
    one or more processors; and
    memory including a plurality of computer-executable components that are executable by the one or more processors to perform a plurality of actions, the plurality of actions comprising:
        obtaining at least one network parameter of a wireless communication network that provides services to one or more user devices at a location, the one or more user devices experiencing a network coverage problem at the location;
        acquiring at least one device parameter of the one or more user devices being used at the location;
        collecting one or more environment parameters associated with the location, the one or more environment parameters affecting whether a wireless telecommunication carrier is able to leverage additional coverage solutions to provide the services at the location;
        receiving a list of one or more coverage solutions, at least one coverage solution of the list comprises implementing Wi-Fi calling for the one or more user devices and an installation of a Wi-Fi router that supports Wi-Fi calling at the location;

prioritizing the list of one or more coverage solutions to generate a prioritized list of one or more coverage solutions for resolving the network coverage problem at the location based at least on a plurality of parameters, wherein the plurality of parameters include the at least one network parameter, the at least one device parameter, and the one or more environment parameters, and wherein at least one of the one or more coverage solutions provides additional network coverage to the one or more user devices utilizing unlicensed spectrum; and determining that a subscriber associated with the one or more user devices is eligible for the one or more coverage solutions in response to one or more conditions being satisfied, the one or more conditions including that an account of the subscriber is a postpaid account, the account of the subscriber is non-delinquent, the one or more coverage solutions are available for use at the location, and the one or more coverage solutions are not previously implemented for the location.

* * * * *